Patented Dec. 27, 1938

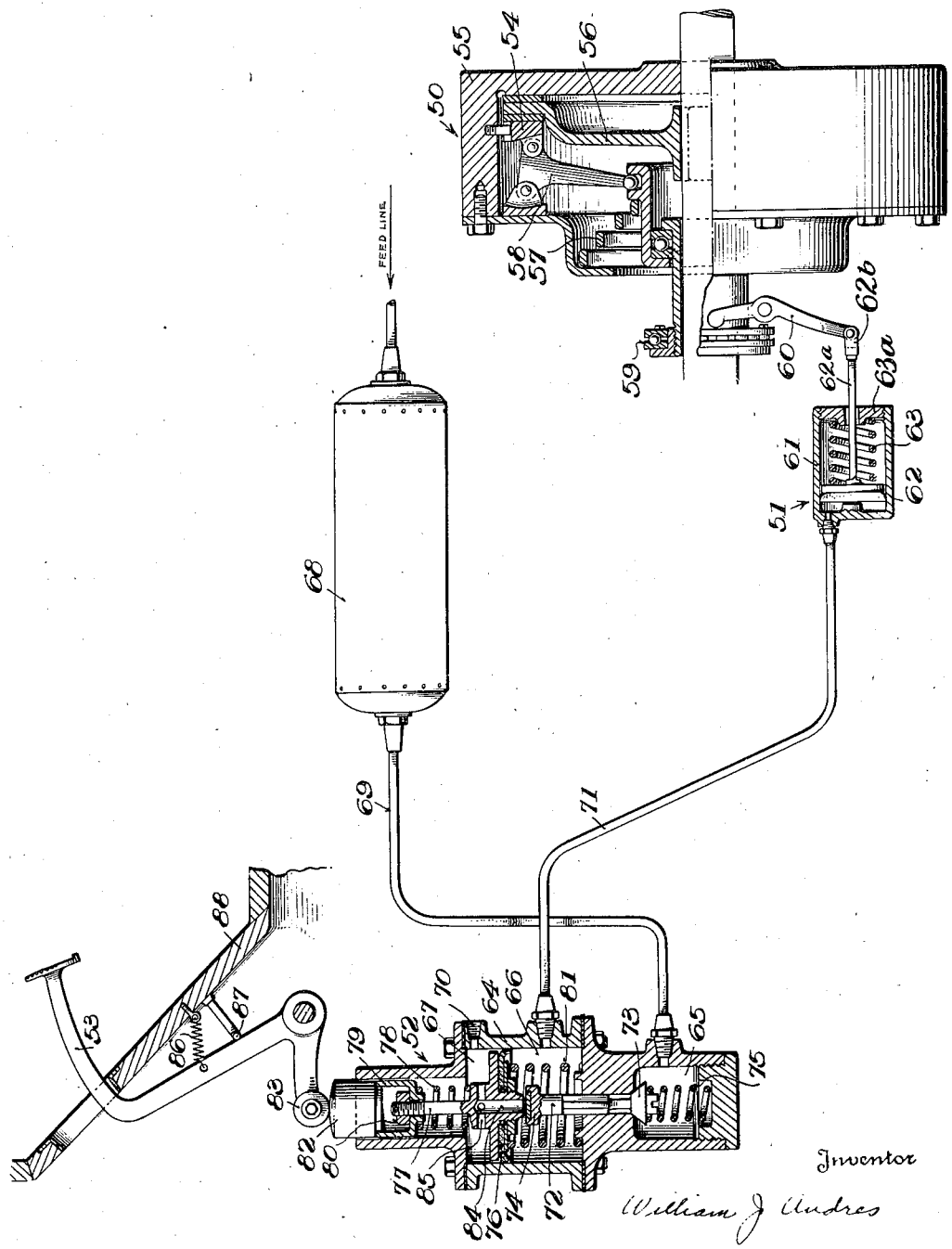

2,141,678

UNITED STATES PATENT OFFICE 2,141,678

FLUID PRESSURE CONTROL MECHANISM

William J. Andres, Pittsburgh, Pa., assignor to Bendix-Westinghouse Automotive Air Brake Company, Pittsburgh, Pa., a corporation of Delaware Application March 25, 1935, Serial No. 13,008

4 Claims. (Cl. 192—91)

This invention relates to control mechanism and more particularly to remotely-controlled fluid pressure-operated mechanisms especially adaptable for use in connection with motor vehicles.

It has heretofore been proposed to employ remote controlling mechanism for various types of devices including motor vehicle clutches, and such mechanisms have been operated in various manners, as for example, by electrical means, mechanical means and fluid means. With the advent of the present-day rear-powered motor vehicles, the problem of the remote control of vehicle-controlling members, heretofore readily accessible to the operator for manual operation, has become quite serious and the present invention is directly concerned therewith.

In general terms, the object of the present invention is to provide a mechanism for the remote controlling of vehicle-control members which directly depend, for their successful operation, upon a predetermined angular or positional relationship with respect to the master controller or operator-controlled member, as for example, a vehicle clutch. One of the objects of the present invention is to correlate these elements to the controlling mechanism in such a manner that the movements of the former are synchronized with the controlling movements of the latter, to the end that the operation of the clutch may be finely graduated throughout substantially the entire range of movement of the controlling mechanism in a manner simulating precise and direct manual control.

More particularly, the invention contemplates the utilization of any suitable fluid pressure differential, such as air under pressure, for the actuating medium and includes a motor directly associated with the vehicle clutch and provided with a precompressed resilient means, the preloading of such means being sufficient to insure finely-graduated return movement of the motor to neutral position upon release of fluid pressure medium therefrom. A self-lapping valve is contemplated for controlling the flow of fluid pressure to the motor and the construction of this valve is such that synchronized movement of the motor will result in accordance with manual operation of the valve.

In order that those skilled in the art may more fully understand the nature of the present invention and its application to vehicle-controlling members, a form of the invention has been set forth hereinafter by way of description and exemplification in the accompanying drawing. It is to be expressly understood, however, that the drawing is employed for purposes of illustration only and is not designed as a definition of the limits of the invention, reference being had for this purpose to the appended claims.

Referring to the drawing, the invention is disclosed therein as applied to a motor vehicle clutch remotely controlled in such a manner as to secure finely-graduated engaging and disengaging movement thereof to the end that the clutch may be controlled in a manner simulating manual control and avoiding the disadvantages of excessive pedal throw. As herein disclosed, the disengaging and engaging movements of a clutch 50 are controlled by means of a fluid motor 51, the application and exhaust of fluid power to the latter being remotely controlled by a self-lapping valve mechanism 52 adapted to be operated by a manually-operable lever or pedal 53.

More particularly, the clutch disclosed comprises a driving element 54 normally drivably connected to an engine-driven flywheel 55 and a driven element 56, these elements being normally biased to engaged position as by means of a spring 57 acting through toggle levers 58, the initial biasing or preloading of the spring 57 being sufficient to transmit the maximum torque of the vehicle engine. A suitable throw-out mechanism including a collar 59 is provided for effecting disengaging movement of the clutch member 54 and a throw-out lever 60 is adapted to cooperate with the collar 59 to effect disengagement of the clutch, the lever in its normal position, however, being slightly spaced from the collar in order to avoid excessive wear of the latter during engagement of the clutch.

The motor 51 is constituted by a cylinder and piston assembly 61 and 62 respectively, the latter being connected to the throw-out lever 60 and being resiliently biased to the position shown as by means of a precompressed spring 63, the degree of precompression of said spring being such that upon application of fluid pressure to the motor 51, the piston 62 will be moved synchronously with changes in the fluid pressure differential, the preloading also serving to permit gradual engagement of the clutch upon gradual release of fluid pressure from the motor 51 to the end that a fine and accurate graduated clutch-engaging and disengaging operation may be effected remotely.

In order to properly and effectively control the flow of fluid pressure to the motor 51, the remotely-positioned self-lapping valve mechanism 52 includes a casing 64 providing intake, outlet and exhause chambers 65, 66 and 67 respectively, the intake chamber communicating with a reservoir of fluid pressure 68 by means of a conduit 69. The exhaust chamber 67 communicates with the atmosphere through port 70, while the outlet chamber 66 is in constant communication with the cylinder 61 through conduit 71.

In the form of the invention illustrated, a combined intake and exhaust valve assembly 72 is provided for controlling admission and exhaust of fluid to and from the chamber 66, and this valve assembly includes an intake valve 73 and an exhaust valve 74, the same being normally maintained in the position shown, that is with the intake valve 73 closed, as by means of a spring 75. Housed within the chambers 66 and 67 and forming a partition therebetween, is a pressure-responsive element constituted by a piston 76 which has an upwardly-directed stem 77 connected thereto, the lower portion of which forms a seat for a precompressed graduating spring 78, the upper end of said spring bearing against a cap 79 slidably received by the threaded upper end of the stem 77. An adjusting nut 80 is adjustably carried by the stem 77 and serves to vary the degree of precompression of the spring 78 to the initial value desired, and preferably this adjustment is made in such a manner that the initial fluid pressure differential conducted to the motor 51 will be of such value as to balance the effects of precompressed springs 63 and 57 as well as to take up the slight lost motion existing between the clutch throw-out lever 60 and the collar 59. A relatively light spring 81 bears upon the underside of the pressure-responsive element 76 and serves to normally maintain the valve-actuating assembly comprising element 76, springs 78 and cap 79 in the position shown where the button 82 carried by the cap is in constant contact with the end 83 of the lever 53. The pressure-responsive element is provided with communicating exhaust passages 84 and 85, the former of which is normally spaced from the exhaust valve 74 in order to connect the chamber 66 to the atmosphere through chamber 67 and passage 70. It will also be understood that suitable light resilient means, such as a spring 86, is provided for maintaining the pedal 53 in normal neutral position where the same engages a suitable stop mechanism 87 carried by the floor-boards 88 of the vehicle.

In the operation of this form of the invention, initial depression of the pedal 53 will effect downward movement of the valve-actuating assembly constituted by element 76, spring 78 and cap 79 as a unit, to close the exhaust valve 74 and slightly open the intake valve 73. Fluid pressure will thereupon be conducted from the reservoir 68 to the outlet chamber 66 through the open intake valve and thence through the conduit 71 to the motor 51. This flow of fluid pressure will continue until the pressure within chamber 66 is sufficient to move the piston 76 upwardly in opposition to the preloading of the graduating spring 78 in order to permit a closing of the intake valve 73 and consequent lapping of the valve mechanism. As heretofore stated, the pressure under these circumstances existing in the motor 51 will be sufficient to balance the effect of precompressed springs 63 and 57. Further depression of the pedal 53, however, in an amount equal to the degree of movement when initially depressed, will effect a slight additional flow of fluid pressure to the motor 51 in an amount proportional to the increase in the compression of the graduating spring 78. Subsequent increments of movements of the pedal in like manner will effect like increases in the change of the fluid pressure differential conducted to the motor 51 to the end that precise graduated opening and closing movements of the clutch may be effected synchronously with corresponding movements of the clutch-controlling, remotely-positioned pedal 53.

From the above, it will be understood that a definite range of pressures is provided for controlling clutch engagement and disengagement and that such range of pressures is directly proportional to the position of the pedal 53 of the controlling valve mechanism. In the event of wear of the clutch 50, however, it will be appreciated that with the clutch engaged, the spring 57 associated therewith will be extended further and will hence exert a lesser pressure on the clutch parts 54 and 56. Under these conditions, less pressure will be required to disengage the clutch and the positional relationship between the controlling pedal 53 and the clutch parts will hence be changed. In order to maintain such positional relationship, means has been provided for adjusting the pre-compressional loading of spring 63 associated with the clutch motor 51. Such means comprises the cylinder head 63a which is adjustably threaded in cylinder 61 and which may be adjusted to increase the loading upon the spring 63 in order to compensate for the decrease in loading of the spring 57 in consequence of clutch wear.

With the above arrangement, as soon as the clutch is worn and the clutch spring 57 is extended and exerts less force upon the clutch parts, the cylinder head 63a is adjusted in such manner as to increase the compression of spring 63 proportionately to the loss of compression of the clutch spring 57. In this manner, the same range of pressures controlled by pedal 53 will serve to graduate the engagement and disengagement of the clutch. In order to prevent "riding of the clutch" after wear has taken place, the piston rod 62a may be shortened by adjusting the clevis 62b.

There has thus been provided by the present invention a remote controlling mechanism especially adapted for vehicle-controlling members of the type wherein efficient operation thereof depends upon a variable positional relationship in response to operation of a master control. The construction of the control mechanism, as will be understood from the foregoing description, is such that vehicle-controlling elements of the type referred to are manipulated remotely in a synchronous and finely-graduated manner to the end that simulation of direct manual control is achieved. This highly desirable result is secured through the use of a power actuator having a resilient means therein which is preloaded to a degree sufficient to avoid erratic action due to friction existing in the mechanism and to insure proper movement of the actuator in response to given changes in fluid pressure applied thereto, in combination with a manually-controlled, remotely-positioned, self-lapping valvular mechanism for controlling the flow of fluid pressure to and from the actuator, the said valvular mechanism also including a resilient device preloaded to a degree such that initial operation thereof serves to admit a fluid pressure differential to the actuator sufficient to balance the preloading of the resilient means associated with the latter. Such an arrangement, in addition to the above features, also enables an accurate control of the vehicle-controlling element throughout substantially the entire range of movement of the operator-controlled member, thus avoiding the objectionable feature of excessive pedal throw heretofore encountered.

While one embodiment of the invention has been herein described and illustrated, it will be well understood by those skilled in the art that the invention is not limited thereto, but may be embodied in various forms. Reference will therefore be had to the appended claims for a definition of the limits of the invention.

What is claimed is:

1. In a remote controlling mechanism for a motor vehicle clutch of the type having a movable member resiliently biased to closed position, a motor operatively connected with said member and including resilient means initially preloaded to a predetermined amount, a self-lapping valvular mechanism including a pre-compressed graduating spring for controlling the application of a definite range of fluid pressure differentials to said motor for graduating the clutch-engaging and disengaging movements thereof, and adjustable means for maintaining constant said definite range of fluid pressure differentials for clutch engagement and disengagement regardless of clutch wear.

2. In a remote controlling mechanism for a motor vehicle clutch of the type having a movable member resiliently biased to closed position, a motor operatively connected with said member and including resilient means initially preloaded to a predetermined amount, a self-lapping valvular mechanism including a pre-compressed graduating spring for controlling the application of a definite range of fluid pressure differentials to said motor for graduating the clutch-engaging and disengaging movements thereof, and means for adjusting the preloading of the resilient means of said motor for maintaining constant said definite range of fluid pressure differentials for clutch engagement and disengagement regardless of clutch wear.

3. In a remote controlling mechanism for a vehicle clutch of the type having a pair of cooperating members, a pre-compressed spring normally maintaining said members engaged, a motor for disengaging said members and for controlling the engagement thereof, a pre-compressed spring associated with said motor, self-lapping valvular means having a pre-compressed graduating spring embodied therein, a pedal for operating said valvular means through said graduating spring for controlling the application and release of a range of fluid pressure differentials to said motor, the throw of said pedal after such movement thereof as to admit a fluid pressure differential sufficient to overcome the pre-compression of said motor and clutch springs causing proportionate relative movements between said clutch members through operation of said valvular means and clutch motor, and means for maintaining constant the relation between the pedal throw and relative movements between the clutch members irrespective of wear of the latter.

4. In a remote controlling mechanism for a vehicle clutch of the type having a pair of cooperating members, a pre-compressed spring normally maintaining said members engaged, a motor for disengaging said members and for controlling the engagement thereof, a pre-compressed spring associated with said motor, self-lapping valvular means having a pre-compressed graduating spring embodied therein, a pedal for operating said valvular means through said graduating spring for controlling the application and release of a range of fluid pressure differentials to said motor, the throw of said pedal after such movement thereof as to admit a fluid pressure differential sufficient to overcome the pre-compression of said motor and clutch springs causing proportionate relative movements between said clutch members through operation of said valvular means and clutch motor, and means for adjusting the precompression of the motor spring for maintaining constant the relation between the pedal throw and relative movements between the clutch members irrespective of wear of the latter.

WILLIAM J. ANDRES.